May 28, 1946.　　　H. A. THORNDIKE　　　2,401,279
METHOD OF AND APPARATUS FOR FINISHING SPLIT SEALING RINGS
Filed Jan. 8, 1945　　　6 Sheets-Sheet 1

Inventor
Herbert A. Thorndike

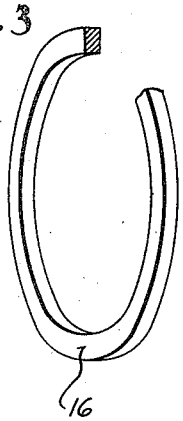
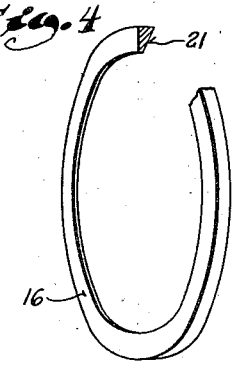
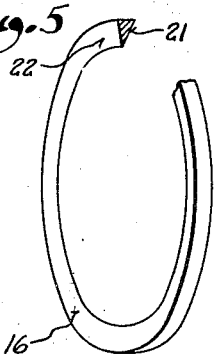
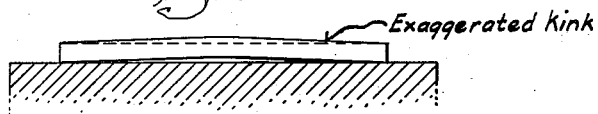
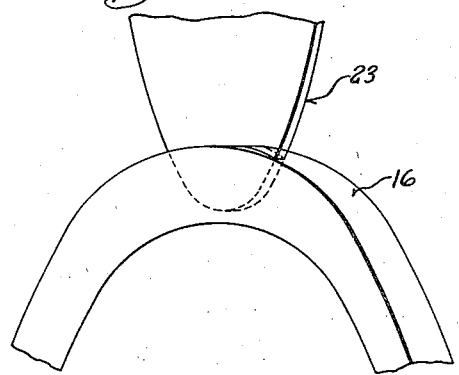
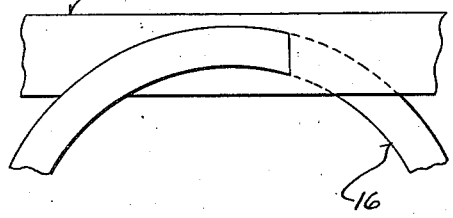
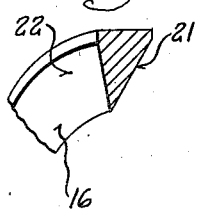
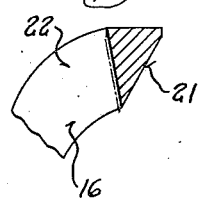
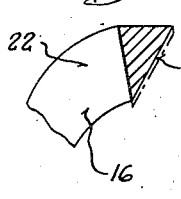
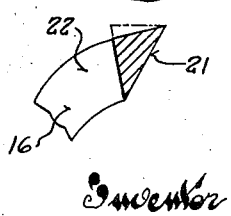

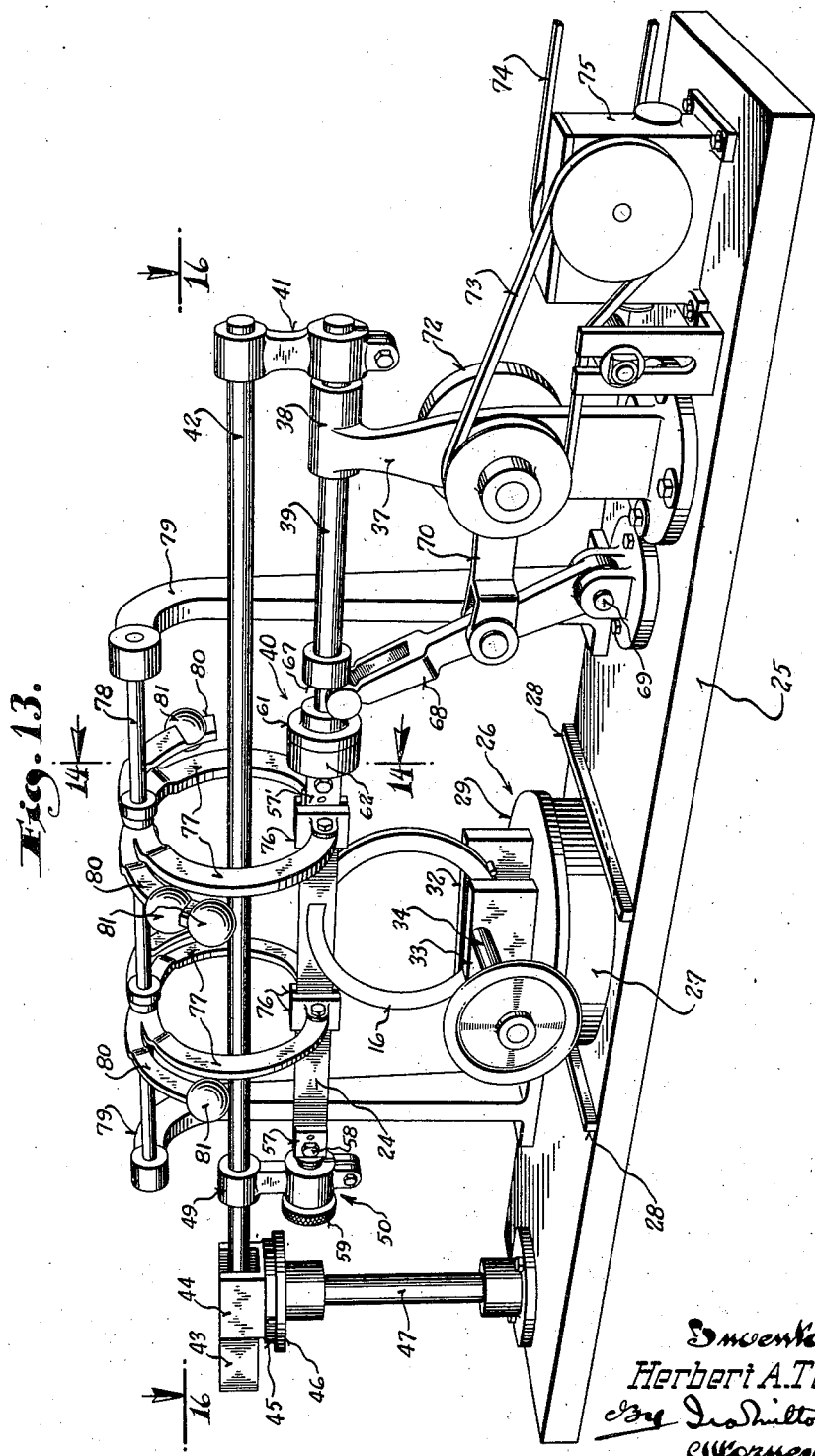

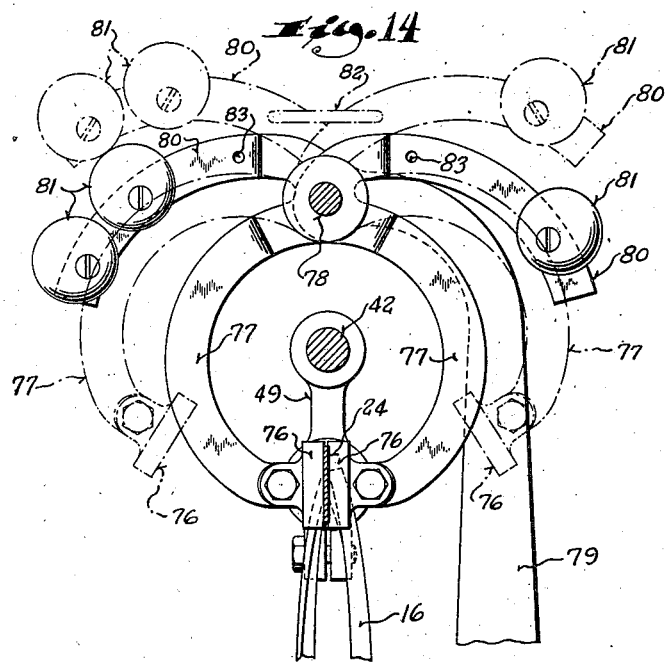
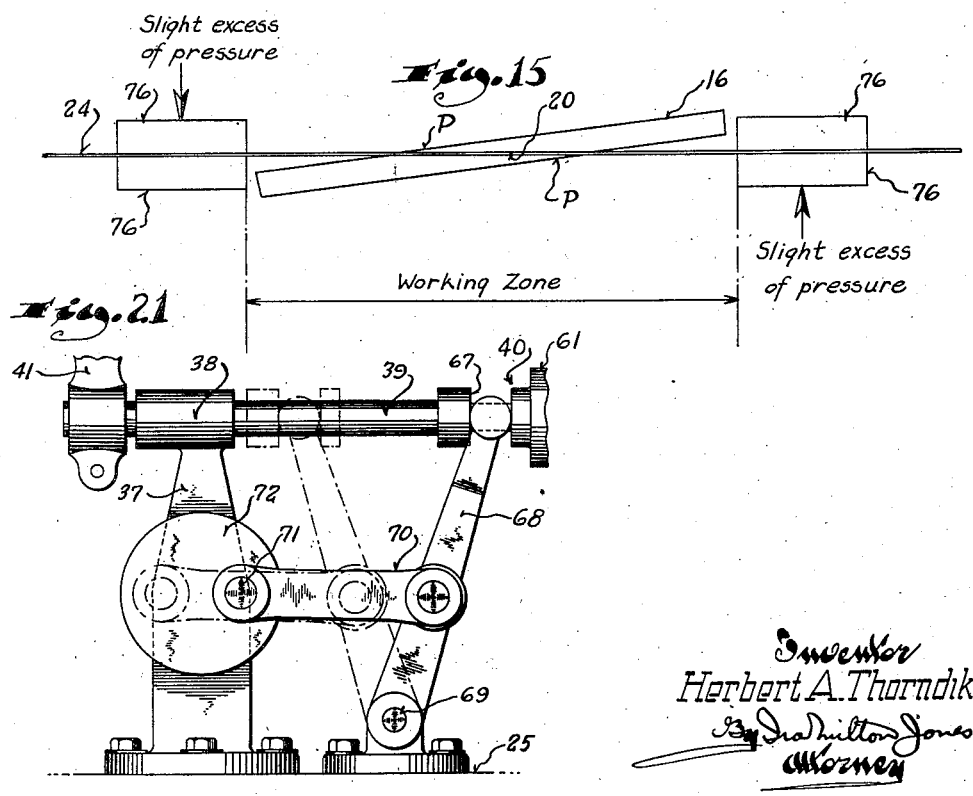

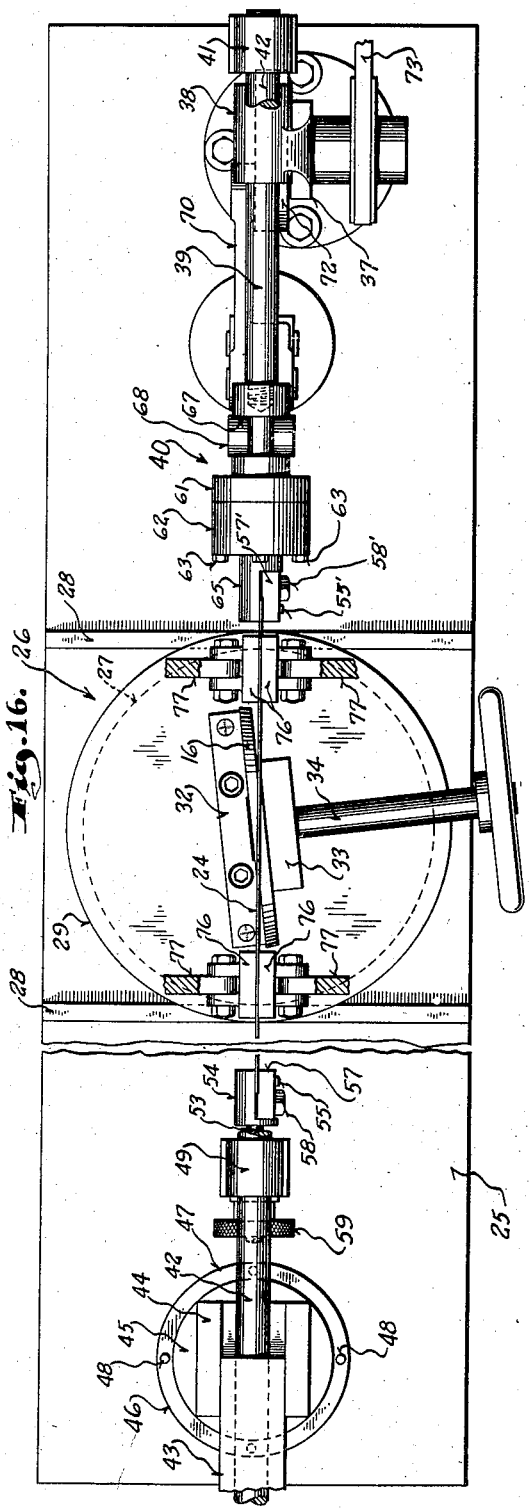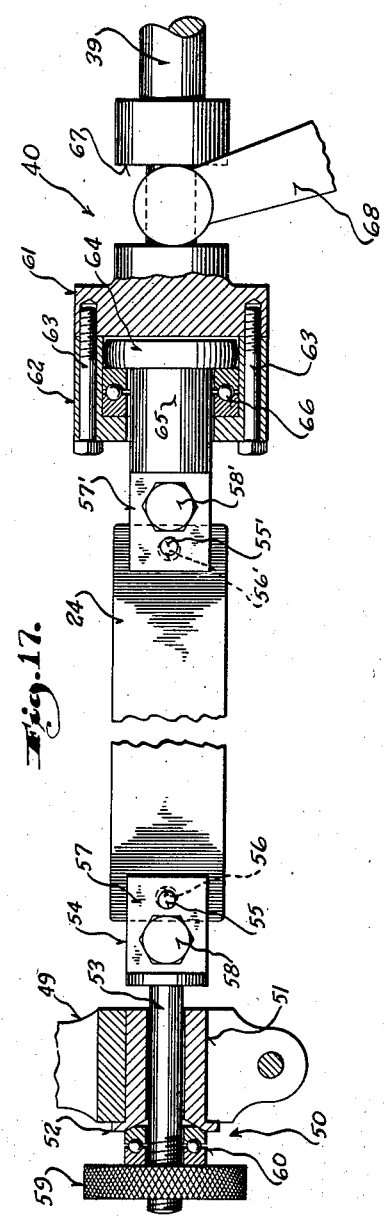

May 28, 1946. H. A. THORNDIKE 2,401,279
METHOD OF AND APPARATUS FOR FINISHING SPLIT SEALING RINGS
Filed Jan. 8, 1945 6 Sheets-Sheet 6
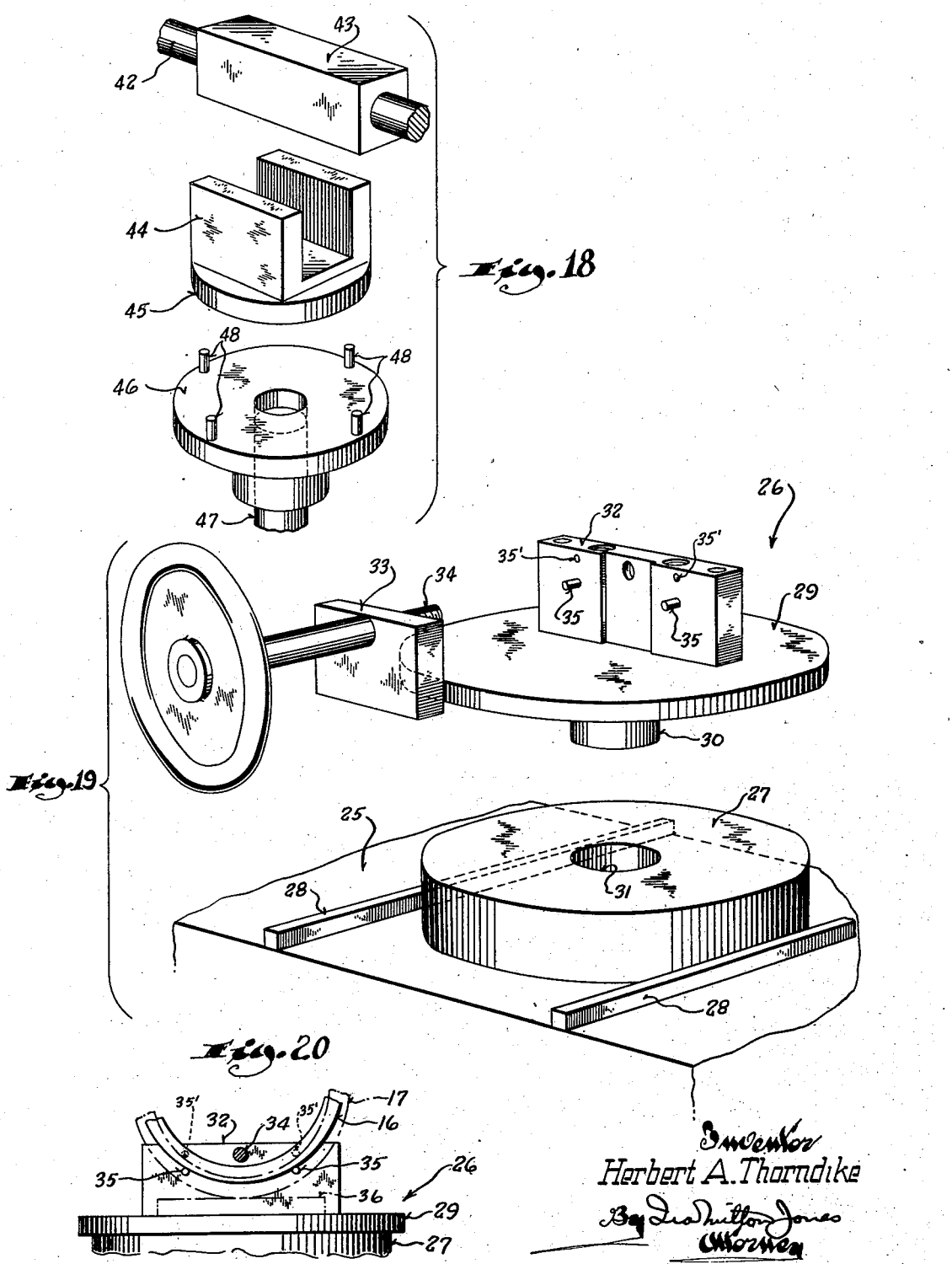
Inventor
Herbert A. Thorndike Patented May 28, 1946

2,401,279

UNITED STATES PATENT OFFICE 2,401,279

METHOD OF AND APPARATUS FOR FINISHING SPLIT SEALING RINGS

Herbert A. Thorndike, Oshkosh, Wis., assignor to March Engineering Company, Oshkosh, Wis., a corporation of Wisconsin Application January 8, 1945, Serial No. 571,907

17 Claims. (Cl. 51—59)

This invention relates to the production of split sealing rings and refers particularly to a method of and apparatus for finishing the surfaces of the split in such rings.

Although by no means limited thereto, the invention will be described in connection with so-called artillery rings which are used to seal the juncture between the breechblock and the breech end of a gun barrel. In this field the invention has effected great savings in time and cost of production.

Artillery is divided into two classes; those using fixed cartridge type ammunition in which the shell and the propelling charge are carried in one casing, and those wherein loose powder bags are employed for the propelling charge. The larger, heavier artillery belongs to this second class and it is here where the split sealing rings of this invention are used.

The function of the rings is to provide a gastight seal at the juncture between the breechblock and the breech end of the barrel. To insure this gastight seal the rings must be positively accurate in all dimensions and the split in the ring must be gastight; otherwise the gases generated under the terrific pressure resulting from the explosion of the propelling charge would leak through the breech mechanism reducing the efficiency of the gun and increasing the danger to the gun crew.

Heretofore the finishing of the split in these rings has been a very costly, slow hand operation. The primary object of this invention, therefore, is to provide a method and apparatus for finishing these rings and especially the surfaces of the split therein, by which the slow, costly and painstaking hand work is eliminated. The extent to which this invention achieves this objective is evident from the fact that on a ring approximately eight inches in diameter, the production time in finishing the split has been reduced from a previous twelve hour hand operation to a fifteen minute machine operation followed by a half hour manual dressing up.

More specifically it is an object of this invention to provide a machine for simultaneously finishing both surfaces of the split in the ring, the machine being so designed and constructed that absolute accuracy is assured by having the work surfaces being acted upon constitute the sole guide for the work performing tool. In this connection it may be said that the machine of this invention is novel in that it provides a full floating support for the reciprocating work performing tool, specifically a honing blade, and a support for the work which is free to float in all directions excepting along the line of reciprocation of the honing blade.

Another object of this invention resides in the method by which the ring is prepared for machine finishing of its split and specifically in the manner in which the ring is treated preparatory to being split so that after the split is made the spring tension of the ring holds the split shut.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figures 3, 4 and 5 are perspective views showing different stages in the production of the ring;

Figure 6 illustrates in exaggerated manner the kink that is made in the ring preparatory to splitting it so that after the split is made its surfaces close on each other by spring tension;

Figure 7 is a perspective view illustrating the manner in which the split is made;

Figure 8 is a side view of the ring and showing the way in which the honing blade fitting in the split operates to finish the surfaces thereof;

Figures 9, 10, 11 and 12 are views showing the ring in different stages of completion after the split is finished;

Figure 13 is a perspective view of the machine used in honing of the surfaces of the split;

Figure 14 is a cross sectional view through the machine taken on the plane of the line 14—14 in Figure 13;

Figure 15 is a diagrammatic view illustrating the relationship between the honing blade and the ring, said view being in top plan and showing particularly the neutral working zone;

Figure 16 is a horizontal sectional view through the machine on the plane of the line 16—16 in Figure 13;

Figure 17 is an enlarged view showing specifically the manner in which the ends of the blade are connected to their holders, parts thereof being broken away and in section;

Figure 18 is an exploded perspective view showing the elements of the support for the free end of the blade;

Figure 19 is an exploded perspective view of the elements comprising the work support;

Figure 20 is a detail view in side elevation showing the manner in which the work support accommodates rings of different sizes; and Figure 21 is a fragmentary detail view showing the crank structure by which the blade is reciprocated.

Figure 1:
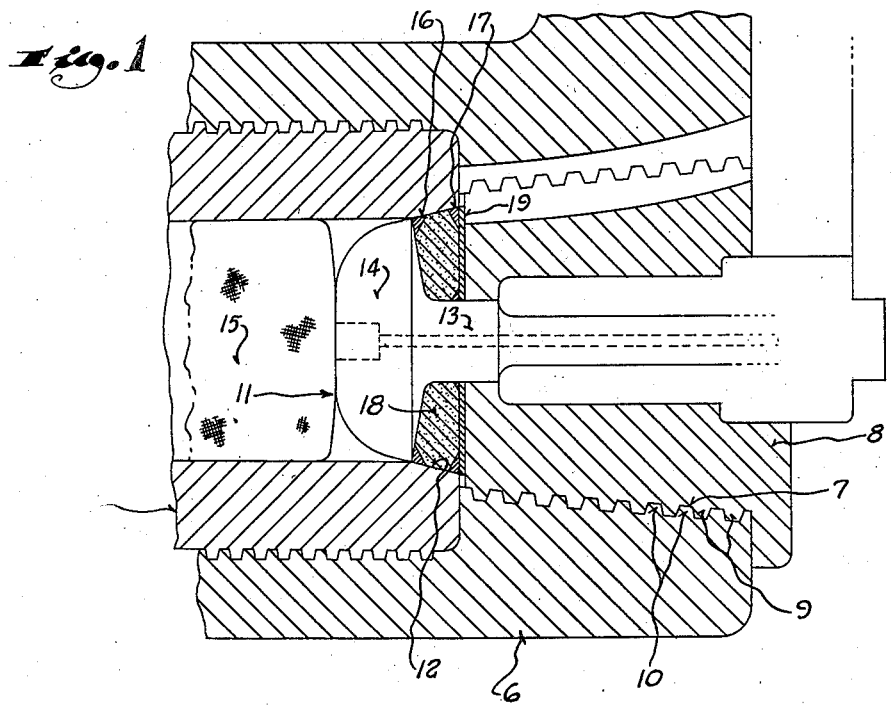
Figure 1 is a cross sectional view through the breech end of a conventional gun of the type using loose powder bags for the propelling charge to illustrate the manner in which the sealing rings of this invention are employed.
Figure 2:
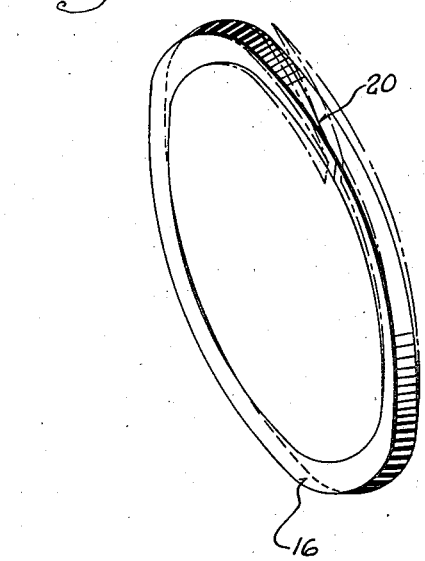
Figure 2 is a perspective view of one of the rings per se, illustrating in dotted lines how the ring may be sprung open.

Referring now particularly to the accompanying drawings, in which like numerals indicate like parts, the numeral 5 designates the barrel of an artillery piece or gun only the breech end of which is shown. Secured thereto is a collar 6, the outer end of which has a tapered opening 7 to receive a breechblock 8. The breechblock is mounted to swing in the usual way into and out of the tapered opening 7, and in moving into place is given a partial turn by mechanism (not shown) to engage circumferentially interrupted threads 9 on the breechblock with complementary circumferentially interrupted threads 10 in the tapered bore of the collar. This, of course, all follows customary practice.

As the breechblock 8 is swung into position the breech end of the barrel is closed by a plug indicated generally by the numeral 11 which enters a tapered bore 12 in the end of the barrel. This plug comprises a spindle 13 carried by the breechblock and having a head 14 which projects into the barrel to take the direct impact of the explosion of the powder bags 15. Between the breechblock 8 and the head 14 of the spindle is a seal comprising front and rear split rings 16 and 17 and a packing 18, a steel plate 19 being interposed between the breechblock 8 and the packing, as shown.

It is to be observed that the seal comprised of the split rings and the packing is tapered to fit the tapered bore in the end of the barrel. Thus as the breech is closed this seal is driven into gastight engagement with the tapered bore 12 to close the firing chamber with a gastight seal.

The front and rear sealing rings 16 and 17, except for difference in diameter and slightly different cross sectional shape, are alike and each has a diagonal split 20 which must be gastight.

The rings are rough cut from tubular stock of adequate size and are first turned to a given outside and inside diameter as illustrated in Figure 3. (The ring illustrated in Figures 3 to 5 and 9 to 12, inclusive, is the front ring.)

After the ring has been turned to given inside and outside diameters one face 21 thereof is cut to an angle as shown in Figure 4. Next the opposite face 22 is cut to a lesser angle as shown in Figure 5. The ring is then heat treated and while hot is placed in a vise and given a kink by means of a tool which grips the ring adjacent to the vise and enables the operator to apply a twist which stresses the ring and provides the necessary spring tension for closing the split after it is cut. While in actual practice the kink thus produced is but fifty thousandths of an inch (.0050") or thereabouts, to show the same it is greatly exaggerated in Figure 6.

A slit is next cut diagonaly into the ring at a point where the tension produced by the kink closes the split thus produced.

As shown in Figure 7, the slit is formed by a thin grinding wheel 23. The surfaces of the split are now ready for finishing to the required closeness. Heretofore this was a tedious, long and expensive hand operation, but with this invention it is accomplished in a few minutes on the machine shown generally in Figure 13 and which incorporates a reciprocable honing blade 24 inserted in the split as shown in Figure 8.

After the machine honing operation the abrasive employed must be cleaned off the surfaces of the split to enable soldering them together for further operations on the ring. This entails hand work but requires only a short time in comparison to the previous practice of finishing the entire ring by hand. Except for the necessity for soldering the split, even this hand operation would not be required.

The several major steps in the operations which follow the soldering of the split are shown in Figures 9 to 12, inclusive. Figure 9 shows the cross section of the ring after the first of these operations in which the two sides are faced to a given dimension. Thereafter the smaller angle, that is the side 22, is faced to a given dimension as shown in Figure 10. Next the larger opposite angle, side 21, is faced to a given dimension. From this point several detail operations follow, all leading to proper sizing of the ring, to be followed by turning its outside diameter to its proper angle as shown in Figure 12. Thereafter all surfaces of the ring are ground and the soldered joint opened and cleaned.

The machine comprises a base 25 upon which a work support, indicated generally by the numeral 26, is floatingly mounted to support the work, in this case one of the rings, in a position at which its split is uppermost so as to receive the honing blade 24 therein. The work support 26 and the honing blade 24 are free to move with respect to each other in all directions necessary to assure having the blade adjust itself to the surfaces of the split being acted upon so that these surfaces alone guide the motion of the blade. To this end the work support 26 comprises a heavy disc 27 which rests flat on the base 25 between two parallel cleats 28 secured transversely to the base to hold the disc against movement parallel to the honing blade while leaving it free for all other horizontal motion on the top of the base. The top of the base between the cleats 28 is kept lubricated to allow free movement of the disc therebetween.

Seated on the disc is a circular plate 29. This plate has a central stud 30 projecting down therefrom to engage in a hole 31 in the disc and constrain the plate to rotation about the axis of the disc.

A fixed abutment 32 is secured to and projects up from the top of the plate 29 to provide one jaw of a clamp in which the ring or other work is gripped. The other jaw 33 is pulled tight against the ring by a hand screw 34.

As shown in Figure 20, the forward face of the fixed abutment 32 has two pins 35 projecting therefrom. These pins serve to locate the rings in the clamp. If the ring is the smaller of the two sizes for which the machine is set up it rests on the pins as shown in full lines in Figure 20. If it is the larger of the two sizes it rests on a removable supporting bar 36 and is centered by engagement of the pins 35 with its inner periphery, the pins being moved to another set of holes 35'. In any event the ring is firmly clamped in place and stands upright with its split uppermost, and by virtue of the full floating mounting of the disc 27 of the base may move in all horizontal directions excepting parallel to the honing bar.

The support for the honing bar comprises a pedestal 37 having a horizontal bearing 38 in its upper end to slidably receive a shaft 39. The inner end of this shaft carries a coupling structure, indicated generally by the numeral 40 to which one end of the honing bar is connected. The other end of the shaft has an arm 41 clamped thereto and extending upwardly therefrom. Secured in the top of this arm is one end of a bar 42, the opposite end of which has a rectangular bearing block 43 fixed thereto which is slidably received in a guide 44.

The guide 44 has a cylindrical base 45 which rests on a table 46 at the top of a pedestal 47. A plurality of pins 48 extending up from the table 46 hold the cylindrical base 45 of the guide 44 in position in a manner allowing the same to move in all horizontal directions.

An arm 49 similar to the arm 41 is suspended from the bar 42 near its bearing block 43. This arm supports a thrust bearing structure, indicated generally by the numeral 50, by which the adjacent free end of the honing blade is supported. This thrust bearing structure comprises a bushing 51 clamped in the lower end of the arm 48 and constrained against endwise movement as a result of tension on the blade by a flange 52 engaging the adjacent side of the arm.

The threaded stem 53 of a blade holder 54 passes through the bushing. The holder 54 has a pin 55 passing through a hole 56 in the blade and a plate 57 held by a screw 58 and clamping the blade to the holder.

A nut 59 is threaded on the outer end of the stem 53 to bear against a thrust bearing 60 interposed between it and the outer face of the bushing which is preferably convex to allow the thrust bearing to see its own position of adjustment. By means of this nut the tension on the blade is adjustable.

The coupling structure 40 which supports the opposite or driven end of the honing blade comprises a head 61 on the end of the shaft 39 to which a hollow cap 62 is secured by screws 63. Inside the cap 62 is the headed end 64 of a holder 65. The outer end of the holder 65, like the holder 54, is adapted to have one end of the blade attached thereto. Like the holder 54 it also has a pin 55' entering a hole 56' in the blade and a clamping plate 57' held in place by a clamping screw 58'.

Sufficient play is provided in the fit between the headed end of the holder 65 and the cap 62 to enable the blade holder to move freely and adjust itself in the cap as required by the blade. To facilitate such adjustment a thrust bearing 66 is interposed between the apertured end of the cap and the head 64 of the holder.

Adjacent to the head 61 the shaft 39 has an annular groove 67 in which the rounded ends of a bifurcated actuating lever 68 are received. The lower opposite end of this actuating lever is pivoted to the base as at 69 and its medial portion is connected by a link 70 to a crank pin 71 on a crank 72 carried by the pedestal 37. The crank 72 is drivingly connected to a suitable power source (not shown) in any desired manner as by means of belt drives 73 and 74 drivingly connected by a gear reduction transmission unit 75. Thus, the honing blade 24 is given a relatively slow reciprocation, and due to the manner in which it is mounted it is entirely free to adjust itself to the work surfaces being acted upon. These surfaces, therefore, consttute the sole guide for the blade.

In the operation of the machine the operator applies a suitable fluid abrasive to the blade, preferably a mixture of oil and an abrasive powder, replenishing the supply as the honing operation proceeds. It has been found, however, that even though the blade is entirely free to adjust itself to the work surfaces and is guided thereby, the minute deflections in the blade, probably caused by the constant change in direction of motion and the stress applied thereon, unless compensated for and guarded against, would impart a slightly convex curvature to the work surfaces being honed.

This objectionable consequence is, however, entirely eliminated by the use of a pair of shoes 76 engaging the opposite faces of the blade at each side of the working zone. These shoes iron out any slight deflection in the blade and absorb the ill effects thereof so that for the space between the sets of shoes, the blade is perfectly straight. The space between the sets of shoes thus may be said to be a neutral working zone in which the blade is free from all possible deflections which might interfere with accurate honing of the work surfaces. Experience has shown that in the operation of the machine over a period of time the absorption by the shoes of any slight deflections that may exist in the honing blade cause the surfaces of the shoes engaging the blade to become slightly concave. The shoes should, therefore, be periodically resurfaced.

Each shoe is pivoted to the outer end of a curved arm 77 freely pivotally supported on a shaft 78 which extends along the top of the machine being supported by pedestals 79 rising up from the back of the base. Each arm 77 also has another outer curved arm 80 joined thereto on which one or more weights 81 are adjustably mounted. The arms 77 of each pair of shoes are oppositely offset and complementary at their point of connection to the shaft 78 so that the shoes carried thereby are directly opposite each other.

As will be readily apparent, the weights 81 press the shoes against the sides of the blade with a pressure depending upon the number of weights and their position on the arms 80.

The diagonal split in the rings forms points P which obviously are more resilient than the directly opposite solid portions of the rings. Thus, as diagrammatically shown in Figure 15, unless this difference in lateral resistance to the honing pressure is compensated, these points P are subjected to greater abrasion than the opposite solidly backed surfaces notwithstanding the fact that the work is being performed in a neutral working zone. To compensate for this disparity in grinding effect a slight excess of pressure is applied on those shoes 76 acting on the faces of the blade which approach and operate on the points P. This slight excess of pressure is conveniently acquired through the use of an additional weight 81 on the arms 80 of the respective shoes 76, as shown in Figure 14.

To facilitate loading the machine the arms carrying the shoes 76 may be held in raised positions by a U-shaped link 82 insertable into the holes 83 in the arms 80 as shown in dotted lines in Figure 14. In this manner the shoes 76 and the arms to which they are attached are held spread apart to facilitate the application and removal of work.

From the foregoing description, taken in connection with the accompanying drawings, it will be readily apparent to those skilled in the art, that this invention greatly facilitates the production of so-called artillery rings and materially lowers the cost of producing the same by eliminating the tedious hand methods by which the diagonal split in such rings was previously finished. It is also apparent to those skilled in this art that while the invention is specifically adapted to the production of artillery rings having such diagonal splits, it may be used with equal advantage where two surfaces of a piece of work, which after finishing are to meet face-to-face, must be finished to an exceedingly close fit.

What I claim as my invention is:

1. In a precision honing machine for simultaneously honing two work surfaces adapted for surface to surface engagement: an integral honing blade of uniform thickness receivable between the work surfaces to be honed with opposite sides of the blade contacting the work surfaces; a work support for holding a piece of work in position with the honing blade between its surfaces to be honed; means floatingly mounting the honing blade in a manner allowing the blade to adjust itself to the surfaces of the work being honed; and means for effecting relative honing motion between the work and blade.

2. In a precision honing machine for simultaneously honing two work surfaces which when finished meet face to face: a honing tool receivable between said work surfaces; a work support for holding the work; means floatingly mounting the honing tool in a manner allowing it to adjust itself to the work surfaces; means for effecting relative honing motion between the work and the honing tool; and means engaging the honing tool at spaced points adjacent to the ends of the work surfaces being honed to absorb deflection in the honing tool before it is brought into work performing engagement with the work surfaces by the relative honing motion between the work and the tool.

3. In a precision honing machine for simultaneously honing two work surfaces which when finished meet face to face: a honing tool receivable between said work surfaces; a work support for holding the work; means floatingly mounting the honing tool in a manner allowing it to adjust itself to the work surfaces; means for moving the honing tool with respect to the work for the performance of its intended function; and means engaging the honing tool at points adjacent to the ends of the work surfaces being honed to preclude carrying deflections in the honing tool into engagement with the work and thus create a neutral working zone in which the honing tool is free from deflections.

4. In a precision honing machine for simultaneously honing two work surfaces which when finished meet face to face: a honing tool receivable between said work surfaces; a work support for holding the work; means floatingly mounting the honing tool and the work support for free relative motion in all directions necessary to allow the honing tool to adjust itself to the work surfaces; means for effecting relative honing motion between the work and tool; and means engaging the honing tool adjacent to the ends of the work surfaces being honed to absorb deflection in the tool and preclude carrying such deflections in the honing tool into the work zone defined by the space between said last mentioned means.

5. In a precision honing machine for simultaneously honing two work surfaces which when finished meet face to face: a reciprocable honing blade receivable between said work surfaces; a work support for holding the work; means floatingly mounting the honing blade and the work support for free relative motion in all directions necessary to allow the honing blade to adjust itself to the work surfaces; means for reciprocating the honing blade; and means engaging the honing blade at longitudinally spaced points adjacent to the ends of the work surfaces being honed to absorb deflection in the blade portions approaching the work surfaces and thus provide a neutral working zone between said last mentioned means across which the blade is free from deflections and in which the honing operation takes place.

6. In a precision honing machine for simultaneously honing two work surfaces which when finished meet face to face: a honing tool receivable between said work surfaces; a support for the work; a support for the honing tool; means floatingly mounting one of said supports so that the work and honing tool are free to adjust themselves to each other to the extent that the work surfaces constitute the guide for the tool; means for effecting relative honing motion between the work and tool; and means engaging the honing tool adjacent to the ends of the work surfaces being honed to absorb deflection in the honing tool portions about to have active engagement with the work surfaces.

7. In a surface finishing machine for simultaneously finishing two surfaces of a piece of work which are to meet face to face: a finishing tool having opposite parallel work treating surfaces receivable between the surfaces of the work to be finished; means for imparting work performing motion to the tool with its work performing portions moving substantially horiontally; means floatingly mounting the work in a manner allowing the same to have any motion on a horiontal plane including bodily shifting, except in a direction parallel to the work performing motion of the tool, and rotation about a vertical axis passing between the surfaces being acted upon by the tool; and means freely movably supporting the tool to enable the same to adjust itself to the work surfaces and be guided wholly thereby.

8. In a surface finishing machine for simultaneously finishing two surfaces of a piece of work which are to meet face to face: an integral blade-like finishing tool of uniform thickness having opposite parallel work treating surfaces receivable between the surfaces of the work to be finished; means for reciprocating the tool; and means so mounting the work and the tool that the work surfaces being acted upon constitute the sole guide for the tool.

9. In a machine for simultaneously finishing two surfaces on a piece of work which are to meet face to face when finished: a tool having opposite parallel work treating surfaces receivable between the surfaces of the work to be finished; means mounting the work and the tool for free relative movement with the tool free to adjust itself to and be guided by the work surfaces being acted upon; means for effecting relative work performing motion between the tool and the work; and auxiliary guides engaging the work performing surfaces of the tool adjacent to the work and at opposite sides thereof to preclude imperceptible deflections of the tool reaching the work.

10. A machine for simultaneously honing the surfaces of a diagonally split sealing ring wherein the spring tension of the ring normally holds said surfaces in engagement, comprising: a support for the ring allowing rotation thereof on an axis lying in the plane of the ring and passing between the surfaces of its split; a honing tool having parallel opposed work performing surfaces receivable in the split of the ring to be gripped by the spring tension thereof; means mounting said honing tool for free movement in all directions necessary to allow the tool to follow the work surfaces being acted upon so that the surfaces of the split guide the tool; and means for effecting relative work performing motion between the tool and the work.

11. A machine for simultaneously honing the surfaces of a diagonally split sealing ring wherein the spring tension of the ring normally holds said surfaces in engagement, comprising: a support for the ring allowing rotation thereof on an axis lying in the plane of the ring and passing between the surfaces of its split; a reciprocable honing tool having parallel opposed work performing surfaces receivable in the split of the ring to be gripped by the spring tension thereof; means mounting said honing tool for free movement in all directions necessary to allow the tool to follow the work surfaces being acted upon so that the surfaces of the split guide the tool; and means for reciprocating the tool.

12. A machine for simultaneously honing the surfaces of a diagonally split sealing ring wherein the spring tension of the ring normally holds said surfaces in engagement, comprising: a support for the ring allowing rotation thereof on an axis lying in the plane of the ring and passing between the surfaces of its split; a reciprocable honing tool having parallel opposed work performing surfaces receivable in the split of the ring to be gripped by the spring tension thereof; means mounting said honing tool for free movement in all directions necessary to allow the tool to follow the work surfaces being acted upon so that the surfaces of the split guide the tool; means for reciprocating the tool; and auxiliary guides engaging the tool at opposite sides of the work, said guides being free to adjust themselves to the tool and serving to dampen out deflection and vibration of the tool resulting from relative work performing motion between the tool and the work.

13. In a machine of the character described: a work performing tool adapted to be reciprocated across the surface of a piece of work; means for reciprocally supporting said tool in a manner allowing the same to swing laterally and with its opposite ends free to twist with respect to each other; and means for reciprocating said tool.

14. In a machine of the character described: a work performing tool adapted to be reciprocated across the surface of a piece of work; means for reciprocally supporting said tool in a manner allowing the same to swing laterally and with its opposite ends free to twist with respect to each other; means for reciprocating said tool; and means engaging opposite sides of the tool at spaced points along the length thereof to define a work performing zone therebetween, said means being free to adjust themselves to the tool and engaging the same with sufficient pressure to iron out slight deflections in the tool as it enters the working zone defined by the space between said last named means.

15. In a machine of the character described: a work support freely rotatable about a vertical axis; a work performing tool; means supporting said tool for reciprocation horizontally along a line above the work support and intersecting the axis about which it may turn, said means allowing the tool a substantial degree of freedom of motion in all directions so that it may readily accommodate itself to the surface of work being acted upon and mounted on the work support; and means for reciprocating the tool.

16. The hereindescribed method of making a split sealing ring for use in artillery pieces to seal the juncture between the firing chamber and breech block which includes the steps of: twisting a portion of a metal ring out of the plane of the remaining portion of the ring to place the ring in tension; cutting a diagonal slit in the ring at a point such that the tension of the ring tends at all times to close the split thus formed; and finishing the surfaces of the split to a gas tight fit by inserting a honing tool between the surfaces thereof and effecting relative work performing motion between the tool and ring while supporting the ring and tool in such a manner that the tool is guided solely by the surfaces of the split.

17. The hereindescribed method of making a split sealing ring for use in artillery pieces to seal the juncture between the firing chamber and breech block which includes the steps of: twisting a portion of a metal ring out of the plane of the remaining portion of the ring to place the ring in tension; cutting a diagonal slit in the ring at a point such that the tension of the ring tends at all times to close the split thus formed; finishing the surfaces of the split to a gas tight fit by inserting a honing tool between the surfaces thereof and effecting relative work performing motion between the tool and ring while supporting the ring and tool in such a manner that the tool is guided solely by the surfaces of the split; and absorbing any slight deflection in the tool portions approaching working engagement with the work.

HERBERT A. THORNDIKE.